US010358527B2

(12) United States Patent
Brule et al.

(10) Patent No.: US 10,358,527 B2
(45) Date of Patent: Jul. 23, 2019

(54) POLYAMIDE AND BIORESOURCED REINFORCEMENT COMPOSITIONS HAVING IMPROVED MECHANICAL PROPERTIES

(75) Inventors: Benoit Brule, Beaumont-le-Roger (FR); Philippe Bussi, Versailles (FR); Gilles Hochstetter, Bernay (FR); Guillaume Le, Colombelles (FR); Barbara Ramfel, Barc (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/130,212

(22) PCT Filed: Nov. 23, 2009

(86) PCT No.: PCT/FR2009/052260
§ 371 (c)(1),
(2), (4) Date: Aug. 5, 2011

(87) PCT Pub. No.: WO2010/058140
PCT Pub. Date: May 27, 2010

(65) Prior Publication Data
US 2011/0288194 A1 Nov. 24, 2011

(30) Foreign Application Priority Data
Nov. 21, 2008 (FR) ..................... 08 57931

(51) Int. Cl.
*C08G 69/36* (2006.01)
*B29B 15/08* (2006.01)
*B29C 70/32* (2006.01)
*B29C 70/46* (2006.01)
*B29C 70/52* (2006.01)
*C08J 5/08* (2006.01)
*C08J 5/24* (2006.01)
*B29C 48/00* (2019.01)
*B29K 105/06* (2006.01)
*B29K 311/10* (2006.01)
*B29L 31/00* (2006.01)
*B29C 48/05* (2019.01)
*B29C 48/15* (2019.01)

(52) U.S. Cl.
CPC .............. *C08G 69/36* (2013.01); *B29B 15/08* (2013.01); *B29C 48/022* (2019.02); *B29C 70/32* (2013.01); *B29C 70/46* (2013.01); *B29C 70/465* (2013.01); *B29C 70/521* (2013.01); *C08J 5/08* (2013.01); *C08J 5/24* (2013.01); *B29C 48/00* (2019.02); *B29C 48/001* (2019.02); *B29C 48/0017* (2019.02); *B29C 48/05* (2019.02); *B29C 48/15* (2019.02); *B29K 2105/06* (2013.01); *B29K 2311/10* (2013.01); *B29L 2031/731* (2013.01); *C08J 2377/00* (2013.01)

(58) Field of Classification Search
CPC .......... C08L 77/00; C08L 77/02; C08L 77/04; C08L 77/08; C08L 77/10; C08L 77/12; C08L 97/02

USPC .......... 524/606, 27, 878, 879; 528/335, 336, 528/338, 310, 312, 323, 324
See application file for complete search history.

(56) References Cited

U.S. PATENT DOCUMENTS

| 3,386,964 | A | * | 6/1968 | Twilley | C08G 69/36 152/451 |
|---|---|---|---|---|---|
| 4,278,779 | A | * | 7/1981 | Nakagawa | C08L 77/00 264/331.19 |
| 4,822,846 | A | * | 4/1989 | Nomura | C08L 77/00 524/538 |
| 5,015,726 | A | * | 5/1991 | Peters | B32B 27/34 428/474.4 |
| 5,663,216 | A | | 9/1997 | Tomka | |
| 6,375,881 | B1 | | 4/2002 | Foelster et al. | |
| 8,066,934 | B2 | | 11/2011 | De Paoli et al. | |
| 2007/0154697 | A1 | * | 7/2007 | Cossement | C03C 25/285 428/292.1 |
| 2008/0193691 | A1 | | 8/2008 | Bussi et al. | |
| 2009/0234047 | A1 | | 9/2009 | De Paoli et al. | |
| 2009/0280311 | A1 | * | 11/2009 | Kumazawa et al. | 428/220 |
| 2010/0059715 | A1 | * | 3/2010 | Tabata et al. | 252/500 |
| 2010/0087585 | A1 | * | 4/2010 | Yasuda et al. | 524/514 |
| 2012/0053268 | A1 | | 3/2012 | De Paoli et al. | |
| 2012/0183711 | A1 | * | 7/2012 | Brule | C08L 77/06 428/36.91 |

FOREIGN PATENT DOCUMENTS

| DE | 2348750 A1 * | 4/1975 | C08K 7/14 |
|---|---|---|---|
| EP | 0 272 503 A1 | 11/1987 | |
| EP | 0272503 | 6/1988 | |
| EP | 0711324 | 5/1996 | |
| EP | 0960162 | 12/1999 | |
| FR | 2 781 492 A1 | 1/2000 | |
| FR | 2 884 518 A1 | 10/2006 | |
| FR | 2911879 A1 * | 8/2008 | |

(Continued)

OTHER PUBLICATIONS

Engles, H.-W., "Rubber. 4. Chemicals and Additives," Ullmanns Encyclopedia of Industrial Chemistry, pp. 1-67, published online 2004.*

(Continued)

*Primary Examiner* — Nicholas E Hill
(74) *Attorney, Agent, or Firm* — Millen, White, Zelano & Branigan, PC

(57) ABSTRACT

One subject of the present invention is a composition that combines at least one polyamide having at least one MXD entity, MXD denoting meta-xylylenediamine or a mixture of meta-xylylenediamine and of para-xylylenediamine, with a bioresourced reinforcement. The invention also relates to the conversion of these compositions, by injection molding or extrusion, into objects that have good mechanical properties, said objects corresponding to technical application specifications such as may be found, for example, in the automotive industry, construction, sport and in electrical or electronic fields.

22 Claims, No Drawings

(56) References Cited

FOREIGN PATENT DOCUMENTS

| JP | 2005 060556 | | 3/2005 |
|---|---|---|---|
| JP | 2006316253 A | * | 11/2006 |
| WO | 0050210 A1 | | 8/2000 |
| WO | 0059989 A1 | | 10/2000 |
| WO | WO 0059989 | | 10/2000 |
| WO | 2006/108721 A1 | | 10/2006 |
| WO | 2007137378 A | | 12/2007 |
| WO | WO 2007 137378 | | 12/2007 |
| WO | WO 2007138743 A1 | * | 12/2007 |
| WO | WO 2008 050568 | | 5/2008 |
| WO | WO 2008050568 A1 | * | 5/2008 |

OTHER PUBLICATIONS

Tufar, W. "Talc," Ullmann's Encyclopedia of Industrial Chemistry, vol. 35, pp. 567-582, published online 2000.*

English-language translation of JP2006-316253A, JPO website, Dec. 12, 2014.*

Morgan, P. W., et al. "Polyamides from Phenylenediamines and Aliphatic Diacids," Macromolecules, 1975, 8, 104-111.*

Herzog, B., "Polyamides," Ullmann's Encyclopedia of Industrial Chemistry, published online 2013, 36 pages.*

Holbery, James, and Dan Houston. "Natural-fiber-reinforced polymer composites in automotive applications." JOM Journal of the Minerals, Metals and Materials Society 58.11 (2006): 80-86.*

Murata, Yukinobu, Kenji Tsunashima, and Naokazu Koizumi. "Dielectric Properties in Polyamides of m-Xylylenediamine and Dicarboxylic Acids." Japanese journal of applied physics38.9R (1999): 5148-5153.*

International Search Report, dated Mar. 16, 2010, issued in corresponding PCT/FR2009/052260.

English Abstract of JP 2005 060556; Unitika Ltd.; "Resin Composition and Molded Product Comprising the Same"; dated Mar. 10, 2005; Espacenet.

English Abstract of WO 00 59989; Cognis Deutschland GMBH; "Composite Substances Based on Renewable Raw Materials"; dated Oct. 12, 2000; Espacenet.

* cited by examiner

POLYAMIDE AND BIORESOURCED REINFORCEMENT COMPOSITIONS HAVING IMPROVED MECHANICAL PROPERTIES

The subject of the present invention is a composition based on polyamide(s) which may or may not be partially biobased, at least one polyamide having at least the MXD unit, said composition comprising biobased or natural reinforcements. The invention also relates to the conversion of this composition into objects which have good mechanical properties and which make it possible to meet technical application specifications such as may be found, for example, in the automotive industry, construction, the sporting goods field and the electrical or electronic fields.

At the current time, in the field of materials based on thermoplastic matrices, no combination exists with natural reinforcements having technical properties sufficient for certain applications that require good rigidity, good thermomechanical strength and good resistance to aging. Moreover, the matrices that it would be desired to combine with these natural reinforcements do not generally have a transformation temperature range which is compatible with the incorporation of such thermosensitive natural reinforcements. It is known that the major constituents of natural reinforcements, such as lignin, hemicellulose and pectins, are particularly thermally sensitive, others, such as α-cellulose, being on the other hand less so.

The term "natural reinforcements" is intended to mean, for example, wood meals, short or long plant fibers (flax, hemp, kenaf, abaca, etc.), continuous fibers, mats resulting from these fibers.

Moreover, there is an increasing interest in materials which result from biobased starting materials, due in particular to the exhaustion of starting materials of fossil origin, which at the same time retain effective usage properties.

Biobased or natural reinforcements are materials which furthermore generally have a density lower than that of inorganic reinforcements, and they are less abrasive with respect to transformation tools compared with inorganic reinforcements. Natural reinforcements are, moreover, inexpensive and consume less energy for their production in comparison, for example, with glass fibers.

On the other hand, biobased or natural reinforcements generally exhibit poor adhesion with respect to polymeric matrices such as polyamides. In certain cases, they must be surface-treated, in order to improve their adhesion with respect to these matrices, with coupling agents, additives, or treatments such as plasma, corona, laser, γ- or UV-irradiation, chemical, mechanical, or thermal treatments or the like.

Polyamides forming the subject of this invention, which can be partially biobased, correspond in particular to the formula A/MXD.Z with Z denoting an entity originating from a diacid and A, when it is present, denoting an entity which can originate from an amino acid, preferably 11-amino, from a lactam, such as lactam-12 or from the X.Y product of reaction of a diamine X and of a dicarboxylic acid Y. This X.Y entity will preferably be biobased, and will correspond, for example, to the entity 10.10, 10.12 or 6.10. The MXD entity, for its part, denotes meta-xylylenediamine or a mixture of meta-xylylenediamine (MXD) and of para-xylylenediamine (PXD), meta-xylylenediamine preferably being predominant in said mixture.

The use of biobased or natural reinforcements involves converting these compositions at temperatures, measured in said compositions in the molten state, which are moderate (typically less than 215° C.), even for short residence times (approximately 2 minutes). The thermoplastic matrix based on polyamide(s) should thus have a transformation temperature range that is compatible with the incorporation of thermosensitive natural reinforcements in order to provide good wetting of the fibers, without degrading them. This can be obtained by judicially selecting the monomers of the matrix based on polyamide(s), but also by the addition of a compound such as stearic acid or lithium salts, as described in document US 2004/0122133.

The present invention is not limited to only biobased or natural reinforcements. In addition to the natural reinforcements, the use of fibers, mineral tissues (glass, carbon, etc.) or fillers (talc, montmorillonite, etc.) can also be envisioned in order to finely adjust the properties, in particular the mechanical properties.

The compositions of the present invention may also contain additives, such as coupling agents, which may be polymeric, impact modifiers, processing aids, UV- and/or heat-stabilizers, fire-retardants such as, in particular, $Mg(OH)_2$, $Al(OH)_3$ and phosphinates.

The matrices of these compositions exhibit good rigidity, typically a tensile modulus of 2 GPa at least after conditioning.

PRIOR ART

Document EP 0 272 503 describes matrices of MXD.10 type (poly(m-xylylenesebacamide)) combined with a semi-crystalline polyamide. These matrices can contain glass fibers. The combination of a second polymer having a melting point from 20 to 30° C. above that of the MXD10 does not allow the combination of natural fibers as there would be a risk of said natural fibers being degraded. In addition, the fibers used are not biobased or natural.

Document WO 2007/137378 describes compositions based on polyamides (including PA6 in particular) and on natural fibers such as curaua fiber. In said document, the biobased nature is provided only by the natural fiber, the matrix being of fossil origin. Said document does not refer to particular difficulties in incorporating the thermosensitive natural fibers into the PA6. Moreover, it is not indicated whether the reported value (5100 MPa) of the tensile modulus of a PA6-curaua fibers mixture (80/20 proportion by weight) is obtained before or after conditioning of the polyamide.

As it happens, the technical documents of PA6 producers all indicate that the tensile modulus of PA6 varies very considerably between the dry state (i.e. on exiting the injection cycle) and the conditioned state (i.e. after 15 days spent at 23° C. and at 50% relative humidity). These technical documents indicate that, on average, the tensile modulus of PA6 in the dry state is of the order of 3000 to 3400 MPa, whereas it is only 900 to 1200 MPa after conditioning. In order to assess the mechanical performance of compositions based on PA6 and on natural reinforcements under conditions of use, it is therefore essential to test pre-conditioned samples.

U.S. Pat. No. 6,270,883 describes compositions based on PA6 and on wood cellulosic fibers, optionally containing coupling agents in order to improve mechanical performance. Here again, the matrix (PA6) is of fossil origin. These PA6-wood cellulosic fiber compositions (70/30 proportion by weight) have tensile moduli of between 5350 and 5700 MPa in the presence of 2% by weight of coupling agent, and between 5100 and 5200 MPa without coupling agent, the PA6 matrix having a tensile modulus of 2750 MPa. However, these performance levels are measured in the dry state. Moreover, the wood cellulosic fibers producing these results were chosen for their higher thermal stability, since they contain at least 95% by weight of α-cellulose, and therefore less than 5% by weight of thermosensitive components such as lignin or hemicellulose.

Document US 2004/122133 describes compositions based on PA6 and on biobased or natural fibers, and also a method for obtaining these compositions, characterized in that a lithium chloride (LiCl) salt is introduced beforehand into the PA6 matrix in order to substantially lower the melting point thereof, which goes from 223° C. to, respectively, 199° C. or 194° C. according to the amount of LiCl added (respectively 3.0% and 3.5% by weight). Thermosensitive natural fibers can therefore be introduced, without risk of degradation, into the PA6/LiCl matrix in the molten state since the polymer can be converted at lower temperatures. However, this process has the drawback of even further promoting the propensity of PA6 to take up moisture again since the salts selected are hydrophilic. The compositions according to the invention do not require the melting point of the polyamide matrix to be lowered.

Documents JP 2005-060556 and US 2006/0202391 describe the combination of PLA (polylactic acid a priori biobased) and kenaf fibers. Now, PLA is difficult to transform in the presence of water since it is an aliphatic polyester. Moreover, PLA is more sensitive to water than polyamides, which means that a perfectible aging behavior can be envisioned.

Document WO 2008/050568 describes compositions based on PA11 and on natural fibers, such as flax, hemp, bamboo or silk. These compositions are biobased but do not result in sufficient mechanical properties, in particular in terms of tensile modulus, owing to the presence of PA11.

Document EP 0 711 324 describes a composition of biodegradable polymer reinforced with natural fibers. The biodegradable polymer is starch which has limited mechanical properties and a high sensitivity to water, thus limiting its value for use.

Document EP 0 960 162 discloses, in example 9 thereof, a method for obtaining a composition based on PA11 and containing 25% by volume of flax fibers, which corresponds to 33% by weight of fibers given the density of PA11 (1.03) and that of flax fibers (1.50). This composition is characterized in particular by a tensile modulus of 4050 MPa (according to standard DIN 53455). It should be noted that, contrary to PA6, the tensile modulus of PA11 is less sensitive to conditioning. The composition described is biobased but does not result in sufficient mechanical properties, in particular in terms of tensile modulus.

The applicant has noted that the combination of at least one polyamide, which may be partially biobased and which contains at least one MXD entity, with biobased or natural reinforcements can make it possible to obtain materials having good usage properties. This polyamide containing an MXD entity exhibits, moreover, a transformation temperature range compatible with the incorporation of thermosensitive natural fibers.

SUMMARY OF THE INVENTION

The invention relates to a composition that combines at least one polyamide having at least one MXD entity, MXD denoting meta-xylylenediamine (MXD), or a mixture of meta-xylylenediamine (MXD) and of para-xylylenediamine (PXD), with one or more biobased reinforcements, the term "biobased" being understood within the meaning of standard ASTM D6852, and more preferentially within the meaning of standard ASTM D6866.

Standard ASTM D6852 indicates the proportion of products of natural origin in the composition, while standard ASTM D6866 specifies the method and the conditions for measuring the renewable organic carbon, i.e. which derives from biomass.

The reinforcement(s) of the composition according to the invention are termed biobased, i.e. it (they) comprise(s) organic carbon derived from biomass and determined according to standard ASTM D6866. In such a case, it may be considered that the composition according to the invention is itself partially biobased, which is an advantage compared with compositions based on non-biobased fibers, for example derived from fossil starting materials.

The invention also relates to methods for producing a composite material from such a composition, the methods for obtaining objects from the compositions of the invention and also the objects and the use of the compositions and objects of the invention.

Admittedly, a composition which contains a biobased polyamide containing natural fibers is known from document WO 00/59989. However, it does not appear, on reading this prior art, to be obvious for those skilled in the art to choose a PA based on MXD and to combine it with biobased reinforcements, in order to obtain a material which has good mechanical properties and which can be transformed at temperatures limiting degradation of the natural fibers. In said document, aliphatic diamines are preferred and exemplified, unlike the MXD which forms the subject of the invention.

DETAILED DESCRIPTION

As a preamble, it is specified that the expression "between" used in the rest of this description should be understood as including the limits cited.

The term "MXD" is understood to mean meta-xylylenediamine or a mixture of meta-xylylenediamine (MXD) and of para-xylylenediamine (PXD). Preferentially, MXD diamine will be predominant in the mixture. This MXD and/or PXD diamine is commonly produced from resources of fossil origin.

The term "biobased" is understood within the meaning of standard ASTM D68652, and more preferentially within the meaning of standard ASTM D6866, as indicated above.

The term "conditioning" is intended to mean residence of the material for 15 days at 23° C. at a relative humidity of 50%.

The term "reinforcement" is intended to mean short or long fibers, woven or nonwoven continuous fibers, a woven or nonwoven mat, or else ground materials, flours, which allow the tensile modulus to be increased when they are combined with polymeric matrices.

The composition according to the invention comprises at least one polyamide, said polyamide having at least one MXD entity.

According to a first variant of the invention, this polyamide is a homopolyamide which corresponds to the formula MXD.Z, the MXD entity being as defined above and the Z entity being an aliphatic, cycloaliphatic or aromatic, $C_4$-$C_{36}$ dicarboxylic acid.

According to a second variant of the invention, this polyamide is a copolyamide corresponding to the formula A/MXD.Z, in which:
  the MXD entity is as defined above,
  the Z entity is an aliphatic, cycloaliphatic or aromatic, $C_4$-$C_{36}$ dicarboxylic acid, and the A entity is chosen from a lactam, an α,ω-aminocarboxylic acid and the product of the reaction of an aliphatic, cycloaliphatic or aromatic, C$_4$-C$_{36}$ dicarboxylic acid with an aliphatic, cycloaliphatic, arylaliphatic or aromatic, C$_4$-C$_{36}$ diamine.

Preferably, the weight proportion of the MXD.Z unit, in the copolyamide of formula A/MXD.Z, represents more than 50%, preferably more than 75% and more preferentially more than 85%.

Otherwise worded, the molar proportion of the MXD.Z unit, in the copolyamide of formula A/MXD.Z, represents more than 25%, preferably more than 50% and more preferentially more than 65%.

Whether in the context of the first or the second variant of the invention, the Z entity may be an aliphatic dicarboxylic acid comprising at least 6, advantageously 7 and more preferentially 10 carbon atoms.

Thus, Z may be an aliphatic diacid of formula HOOC—(CH$_2$)$_y$—COOH with (y+2)=4, 6, 7, 8, 9, 10, 12, 14, 16, 18.

A and/or Z correspond to a preferably biobased entity.

When A is present, it may be obtained from a lactam monomer (in particular caprolactam or lauryllactam), an α,ω-aminocarboxylic acid (such as 6-aminohexanoic acid, 10-aminodecanoic acid, 11-aminoundecanoic acid or else 12-aminododecanoic acid) or the product of reaction between a dicarboxylic acid and a diamine.

The following may in particular be envisioned:
saturated or unsaturated, preferably linear, aliphatic diamines chosen, for example, from butanediamine, pentanediamine, hexanediamine, heptanediamine, nonanediamine, decanediamine, undecanediamine, dodecanediamine, tridecanediamine, tetradecanediamine, hexadecanediamine, octadecanediamine, octadecenediamine, eicosanediamine, docosanediamine and diamines obtained from fatty acids,
aromatic or arylaliphatic diamines, such as, for example, MXD and PXD (para-xylylenediamine),
cycloaliphatic diamines, such as, for example, isophorone diamine, piperazine, 1,3-bisaminomethylcyclohexane or bis(methylaminocyclohexyl)methane (BMACM),
saturated or unsaturated, preferably linear, aliphatic diacids chosen, for example, from succinic acid, adipic acid, heptanedioic acid, azelaic acid, sebacic acid, undecanedioic acid, dodecanedioic acid, brassylic acid, tetradecanedioic acid, hexadecanedioic acid, octadecanoic acid, octadecenoic acid, eicosanedioic acid, docosanedioic acid and dimers of fatty acids containing 36 carbons,
aromatic or arylaliphatic diacids, such as, for example, isophthalic acid, terephthalic acid, 2,6-naphthalenedicarboxylic acid (NDCA) or furandicarboxylic acid,
cycloaliphatic diacids, such as, for example, 1,4-cyclohexanedicarboxylic acid (CHDA).

When the polyamide corresponds to the formula A/MXD.Z, the A entity may be a lactam or an α,ω-aminocarboxylic acid comprising at least 6, and more preferentially at least 10, carbon atoms.

Advantageously, the A entity is chosen from caprolactam, lactam 12, 11-aminoundecanoic acid and 12-aminododecanoic acid.

In the case where the A entity is the product of condensation of a diamine with a dicarboxylic acid, said diamine is an aromatic diamine, preferably meta-xylylenediamine or a mixture of meta-xylylenediamine and of para-xylylenediamine.

The choices of A and Z are preferably made such that:
A and/or Z are of partially or totally biobased origin,
the melting point of the (co)polyamide is less than or equal to 215° C. (measured by DSC—ramp of 20° C./min—according to standard ISO 11357-3 (1999)),
the tensile modulus of the (co)polyamide is greater than or equal to 2000 MPa (measured according to standard ISO 527 1BA on conditioned samples).

Preferably, the following polyamides will be favored: MXD.Z with Z being suberic acid, azelaic acid, sebacic acid, dodecanedioic acid or tetradecanedioic acid. More preferably, Z is sebacic acid. Sebacic acid is commonly obtained from castor oil, which is obtained from the plant of the same name.

Preferably, the following copolyamides will be favored:
A/MXD.Z with A being 11-aminoundecanoic acid or 10-aminodecanoic acid, Z being adipic acid, sebacic acid or dodecanedioic acid. More preferably, Z is adipic acid and A is 11-aminoundecanoic acid. 11-Aminoundecanoic acid is commonly obtained from castor oil, which is obtained from the plant of the same name;
A/MXD.Z, with A being caprolactam or lactam 12, Z being adipic acid, sebacic acid or dodecanedioic acid. More preferably, Z is adipic acid;
A/MXD.Z with A being the product of condensation of a dicarboxylic acid and a diamine, Z being adipic acid, sebacic acid or dodecanedioic acid. Preferably, the dicarboxylic acid of A is chosen from adipic acid, sebacic acid, dodecanedioic acid, isophthalic acid and terephthalic acid. Preferably, the diamine is chosen from hexamethylenediamine, decanediamine, dodecanediamine and MXD. The decanediamine is commonly obtained by amination and then hydrogenation of sebacic acid, itself commonly obtained from castor oil.

When it may prove to be necessary, it is not out of the question to mix the MXD-based polyamide with another polyamide or copolyamide.

Thus, the composition according to the invention may also comprise at least one second polyamide, it being possible for the latter to be a homopolyamide or a copolyamide.

The proportion by weight of this other polyamide or copolyamide (relative to all the polyamides present in the composition) is less than 50%, preferably less than 25%, more preferably less than 15%.

The first and/or second polyamide(s) of the composition may be totally or partially biobased, i.e. comprise organic carbon derived from biomass and determined according to standard ASTM D6866. Thus, the biobased nature of the composition as a whole is further reinforced.

The biobased reinforcement of the composition according to the invention comprises at least one element chosen from plant fibers or flours, animal fibers, biobased polymers, biobased carbon fibers and biobased carbon nanotubes, the term "biobased" always being understood within the meaning of standard ASTM D6852, and more preferentially within the meaning of standard ASTM D6866.

A mixture of two, or more, reinforcements of the same category or of different categories can of course be envisioned in the context of the present invention.

The biobased reinforcements with which the invention is concerned may be:
plant fibers or flours which comprise fibers or flours originating from the seminal hairs of seeds (cotton, kapok), bast fibers or flours extracted from plant stems (flax, hemp, kenaf, jute, ramie, etc.), hard fibers or flours extracted from leaves (sisal, abaca, etc.), from trunks (Manilla hemp, wood in general), from husks of fruits (coconut, etc.),
animal fibers which originate from hairs, such as animal fleece, and secretions such as silk, carbon fibers or carbon nanotubes derived from biobased starting materials,
polymeric fibers obtained from biobased materials,
ground materials from barks, peels or pips (hazelnuts, walnuts, etc.), from animal shells (crabs, etc.), from grains (rice, etc.).

Preferably, the invention is concerned with plant fibers, and more particularly, flax, hemp, sisal, kenaf, abaca or jute fibers.

Preferentially, the biobased reinforcement, whether it consists of just one or several of the elements detailed above, represents from 5% to 50%, preferably from 15% to 40% by weight of the total weight of the composition.

In one particular version of the invention, when the biobased reinforcement is made up of nanotubes of biobased origin, the weight ranges may be reduced in such a way that this reinforcement represents from 2% to 20% by weight of the total weight of the composition according to the invention.

In one advantageous version of the invention, the biobased reinforcement is in the form of a ground material, of a flour, of a short fiber, of a long fiber, of woven continuous fibers, of nonwoven continuous fibers, or of a mat of woven or nonwoven fibers.

The invention also concerns woven or nonwoven, continuous biobased fibers, and biobased tissues (woven or nonwoven mats obtained using these fibers or combinations of these fibers).

When necessary, it is not out of the question to add non-biobased reinforcements such as carbon fibers or carbon nanotubes of fossil origin, glass fibers, etc., in addition to the biobased reinforcement, or else fillers such as talc, chalk, mica, kaolin or montmorillonite.

Thus, the composition according to the invention may also comprise at least one second reinforcement which is not biobased within the meaning of standard ASTM D6852, and more preferentially within the meaning of standard ASTM D6866, it being possible for said second reinforcement to be a carbon fiber, carbon nanotubes or glass fibers.

Preferentially, the weight proportion of all the reinforcements, namely of the biobased reinforcement(s) and, where appropriate, of the non-biobased reinforcement(s), is between 5% and 80%, advantageously between 10% and 70%, preferably between 15% and 50%, and even more preferably between 15% and 40%, of the total weight of the composition.

Advantageously, the (biobased reinforcement(s))/(non-biobased reinforcement(s)) mass ratio is greater than 0.3, preferably greater than or equal to 1, and more particularly greater than or equal to 3.

Preferably, these other non-biobased reinforcements represent less than 30% and more particularly less than 20% by weight of the total weight of the composition according to the invention.

It is also sometimes necessary to modify the reinforcements, in particular the fibers, of the composition according to the invention by means of an appropriate treatment for improving the adhesion of these reinforcements to the matrix.

Thus, the biobased reinforcement and, where appropriate, the non-biobased second reinforcement may undergo a treatment aimed at improving their adhesion with respect to the polyamides, said treatment being chosen from:
a chemical treatment,
a precoating of the reinforcement with a polymeric coupling agent,
a plasma treatment,
a mechanical or thermomechanical treatment,
a laser treatment,
a γ- or UV-irradiation.

Thus, chemical treatments such as the use of aminosilanes, precoating of the fibers with a polymeric coupling agent, plasma, laser, γ-irradiation or UV-irradiation treatment, or another chemical or mechanical treatment for improving the adhesion of these reinforcements, in particular in the form of fibers, to the matrix may be considered. In certain cases, a basic treatment (sodium hydroxide), optionally followed by washing with water, may be used in order to eliminate certain surface compounds, thus allowing better coupling.

Moreover, the compositions of the present invention may also contain one or more additives, such as coupling agents, which may be polymeric, impact modifiers, processing aids, UV-stabilizers, heat-stabilizers, fire-retardants such as in particular $Mg(OH)_2$, $Al(OH)_3$ and phosphinates. The coupling agents targeted herein are intended to improve the adhesion of the reinforcements to the polyamide(s).

These additives generally represent less than 50% by weight, preferably less than 30% by weight, of the total weight of the composition.

For the coupling agents, impact modifiers, processing aids, UV-stabilizers and heat-stabilizers, the content is in particular less than 20% and preferably less than 10% by weight of the total weight of the composition.

Finally, the composition according to the invention may also comprise fillers such as talc, montmorillonite, chalk, mica and kaolin, preferably in a weight proportion that can represent less than 30%, and more particularly less than 20%, of the total weight of the composition.

The compositions based on polyamides and on biobased reinforcements according to the invention are characterized by a tensile modulus in the conditioned state (measured according to standard ISO 527 1BA on samples conditioned for 15 days at 23° C. and at 50% relative humidity) preferably greater than 3500 MPa, more preferably greater than 5000 MPa.

These compositions may be used for the production of a composite material from a composition comprising one (or more) biobased reinforcement(s) in the form of short fibers, said method comprising the following steps:
A— compounding of the biobased reinforcement and of the polyamide(s) in an extruder or a co-kneader between 180 and 240° C., in particular between 200 and 240° C., for example 215° C.,
B— extrusion of the rod,
C— granulation of the rod.

The objects of the invention are obtained:
for a biobased reinforcement in the form of short fibers, by injection molding at 215° C. (or injection compression) of granules of short fibers, with the granule being obtained by compounding the compositions of the invention on an extruder or co-kneader, between 180 and 240° C., in particular between 200 and 240° C., for example at 215° C., and cutting up the rod obtained;
for a biobased reinforcement in the form of long fibers, by injection molding at 215° C. (or injection compression) of granules of long fibers, the granule being obtained by impregnating bundles of continuous fibers in the molten polyamide between 180 and 240° C., in particular between 200 and 240° C., for example at 215° C., by means of a crosshead extruder, and then cutting up the rod obtained. The long fibers in the form of a roving can also be incorporated directly during the injection molding;

for a biobased reinforcement in the form of woven or nonwoven mats, obtaining stratified sheets via hot pressing at between 180 and 240° C., in particular between 200 and 240° C., for example at 215° C., of a stack of alternating woven or nonwoven fiber mats and films of the polyamide(s), or rolling of woven or nonwoven fiber mats onto a film of polyamide(s);

for a biobased reinforcement in the form of fiber bundles, or a mat of fibers (woven or nonwoven), production of preimpregnated materials obtained either by impregnation (coating) of the fibers in a bath of molten polyamide of between 180 and 240° C., in particular between 200 and 240° C., for example at 215° C. (in the case of fiber bundles, with a crosshead extruder), or by impregnation in a fluidized bed (i.e. electrostatic powder coating and then melting of the powder of polyamide(s) in an oven brought to between 180 and 240° C., in particular between 200 and 240° C. (for example at 215° C.), or by powder-coating and then melt-coating at between 180 and 240° C., in particular between 200 and 240° C., for example at 215° C., and then production of the composite from the preimpregnated materials, either by filament winding (winding of the fiber bundles on a mandrel), for the production of hollow bodies for example, or else by pressing and thermoforming of sheets produced from the mats of preimpregnated fibers, for the production of casings;

finally, for a biobased reinforcement in the form of fiber bundles, production of the composite by pultrusion in order to produce profiles (drawing of the fiber bundles and continuous impregnation of the polyamide(s) in the molten state or in a fluidized bed and passage through a heating fixture giving the shape of the cross section of the profile), brought between 180 and 240° C., in particular between 200 and 240° C., and for example at 215° C.

Unless otherwise indicated, the temperature ranges which have just been mentioned are those measured in the composition in the molten state.

The objects obtained from the compositions according to the invention may be components intended:

for the nonlimited automotive sector, such as cylinder-head cover, intake manifold, radiator housing,
for construction sectors,
for electrical or electronic sectors, such as housings, casings or cabinets,
for sporting goods sectors, such as, for example, an element of shoes.

EXAMPLES

Examples 1 and 2: Nonreinforced MXD.10

ISO 527 1BA dumbbell-shaped specimens of polyamide MXD.10 synthesized from meta-xylylenediamine and sebacic acid having a melt flow index (MFI) of 20 g/10 min at 275° C. under 2.16 kg are injection-molded at 210° C. in a mold maintained at 30° C. or 120° C. with a 60-tonne injection-molding press. The granules of polyamide MXD.10 were predried at 60° C. for 12 hours in an oven under vacuum.

The melting point is measured by DSC according to standard ISO11357.

The dumbbell-shaped specimens of MXD.10, but also of PA6 and of PA11, are conditioned for 15 days at 23° C. at a relative humidity of 50%. The tensile properties are obtained with the protocol described in standard ISO 527 1BA.

In table 1 hereinafter, the tensile moduli are compared between MXD.10 injection-molded at 210° C., polyamide-6 (PA6, Ultramid® 8202 sold by BASF) injection-molded at 260° C. and polyamide-11 (PA11, Rilsan® BMNO TLD sold by Arkema) injection-molded at 240° C.

TABLE 1

|  | Examples | | Comparative examples | |
|---|---|---|---|---|
|  | 1 | 2 | A[1] | B[2] |
| Polyamide | MXD.10 | MXD.10 | PA6 | PA11 |
| T injection (° C.) | 210 | 210 | 260 | 220-240 |
| T mold (° C.) | 120-125 | 30-35 | 80 | 30-60 |
| Melting point (° C.) | 193 | 193 | 220 | 187-191 |
| Nonconditioned tensile modulus (MPa) | 3700 | 2700 | 2800 | 1260 |
| Conditioned tensile modulus (MPa) | 3600 | 2550 | 970 | 1070 |
| Density (g/cm$^3$) ISO R1183 D | 1.12 | 1.12 | 1.14 | 1.03 |

It is important to note that the PA MXD.10 is much less sensitive to the conditioning (less water uptake) than PA6 since the tensile moduli decrease by 2% to 6% for the PA MXD.10, whereas for PA6, the modulus decreases by 66%. This advantage is considerable especially when untreated natural reinforcements which generally increase the water uptake of the compound are introduced.

Furthermore, the PA MXD.10 can be injection-molded at 210° C., whereas polyamide-6, for its part, is preferentially injection-molded at 260° C. and polyamide-11 at 240° C.

It emerges from this comparison that it is necessary to take into account the properties, in particular mechanical properties, measured on samples which have been conditioned.

Examples 3 and 4 and Comparative Examples C to F: Polyamides with 15% by Weight of Reinforcements Various compositions comprising 85% of a polyamide and 15% by weight of reinforcements were prepared from the following products:

The polyamides used are the following:
the polyamide MXD.10 (Mp of 193° C.) is identical to that of examples 1 and 2;
the polyamide 6 (denoted PA6, Mp of 220° C.) corresponds to the Ultramid® B3 commercial grade from the company BASF;
the polyamide 11 (PA11, Mp of 187-191° C.) corresponds to the Rilsan® BMNO grade from the company Arkema France.

The melting points Mp mentioned above were measured by DSC according to standard ISO 11357.

The non-biobased reinforcement is made up of glass fibers which have been sized in order to provide coupling with the matrix. These glass fibers are denoted "GF" in table 2 below.

The biobased reinforcements tested are:
cellulose microfibrils (denoted "cellulose" in table 2 below) sold by the company Rettenmaier under the trademark Arbocel®. The grade chosen in this example is BWW40 consisting of more than 99% by weight of cellulose;

flax fibers (denoted "flax" in table 2 below) sold by the company Dehondt under the trademark Lintex®. The grade chosen in this example is M10F.

Before mixing, these biobased reinforcements are predried at between 100° C. and 110° C. in an oven for 12 hours under vacuum. Likewise, the granules of PA MXD.10, PA6 and PA11 are predried at between 60° C. and 80° C. for 12 hours in an oven under vacuum.

The mixtures of polyamides and of biobased reinforcements as detailed in table 2 below are prepared in an Explore® co-rotating twin-screw microextruder from the company DSM. This tool consists of a thermoregulated mixing chamber equipped with 2 co-rotating screws. The products are introduced by means of a sliding piston. The mixing chamber is equipped with a recirculation channel and with a die that can be closed, which makes it possible to recirculate the material for a fixed period of time. The die is then opened and the material is collected in a chamber which is also thermally regulated (heat gun). This heat gun is then connected to a microinjector which makes it possible to mold ISO 527 1BA standardized dumbbell-shaped specimens by applying a cycle of varying pressures and controlled molding times, like what is commonly done with an injection-molding press. The mold is also thermoregulated, which makes it possible to mold at varying temperatures.

For the examples described below, the mixtures are prepared:
  at a temperature between 190° C. and 220° C. measured in the molten material for the mixtures comprising PA MXD.10, or PA11, and natural reinforcements, and
  at a temperature of 230° C. measured in the molten material for the mixtures comprising PA6 and natural reinforcements.

The biobased reinforcements and the polyamides are introduced into the thermoregulated mixing chamber by means of the sliding piston. The mixtures are prepared with a screw speed set at 100 rpm. The recirculation time chosen is 90 seconds. During the injection, the heat gun is thermoregulated at a temperature similar to the mixing temperature and the mold at between 40° C. and 80° C. The maximum pressure of the cycle is 16 bar. The residence times in the mold are between 6 and 20 seconds.

The dumbbell-shaped specimens obtained from various compositions of examples 3 and 4 in accordance with the invention and of comparative examples E and F are then conditioned for 15 days at 23° C. at a relative humidity of 50%.

The mechanical properties of these dumbbell-shaped specimens after conditioning, in particular the values of the tensile moduli, are evaluated by adhering to the protocol described in standard ISO 527 1BA. The tensile modulus values (MPa), the standard deviation values and also the density values are given in table 2 below.

This table 2 also reports the tensile modulus values (according to standard ISO 527 1BA) and density values recorded:
  for comparative example C: on the technical sheet of the Ultramid® B3EG3 (PA6+glass fibers) commercial grade from the company BASF,
  for comparative example D: on a technical sheet of a mixture of PA11 and glass fibers, manufactured by the company Arkema France.

TABLE 2

| | Examples | | Comparative examples | | | |
|---|---|---|---|---|---|---|
| | 3 | 4 | C | D | E | F |
| Polyamide (85% by weight) | MXD. 10 | MXD. 10 | PA6 | PA11 | PA11 | PA6 |
| Reinforcements (15% by weight) | cellulose | flax | GF | GF | flax | flax |
| Tensile modulus (MPa) | 4000 | 4000 | 3500 | 3000 | 2000 | 1900 |
| +/− standard deviation | +/−500 | +/−500 | — | — | +/−500 | +/−250 |
| Density | 1.16 | 1.20 | 1.24 | 1.12 | 1.08 | 1.16 |

It is observed that the tensile moduli of examples 3 and 4 reach values which are at least equal to, or even greater than, those of conditioned dumbbell-shaped specimens formed from PA6 and glass fibers (comparative example C), for much lower densities.

Moreover, the tensile modulus values of example 4 (MXD.10+flax) are very much greater than those of comparative example E (PA11+flax) and even remain greater than those of comparative example D (PA11+glass fibers).

Finally, the tensile modulus values of example 4 (MXD.10+flax) are also very much greater than those of comparative example F (PA6+flax).

Example 5 and Comparative Examples G to K:
Polyamides with 30% by Weight of Reinforcements Various compositions comprising 70% by weight of a polyamide and 30% by weight of reinforcements were prepared from the products indicated hereinafter.

The polyamides used are the following:
  the polyamide MXD.10 (Mp of 193° C.) is identical to that of examples 1 to 4,
  the polyamide 6 (PA6, Mp of 220° C.) corresponds to the Ultramid® B36 commercial grade from the company BASF,
  the polyamide 11 (PA11, Mp of 187-191° C.) corresponds to the Rilsan® BMNO commercial grade manufactured by the company Arkema France.

The melting points Mp mentioned above were measured by DSC according to standard ISO 11357.

The non-biobased reinforcement is made up of the same sized glass fibers mentioned for comparative examples C and D described above. These glass fibers are denoted "GF" in table 3 below.

The flax fibers (denoted "flax" in table 3 below) are the same as those already used in example 4 and comparative examples E and F.

The protocol for preparing the compositions and for producing the dumbbell-shaped specimens which is described for examples 3 and 4 and comparative examples E and F is reproduced, but with 30% by weight of biobased reinforcements in the dry mixture before introduction into the microextruder, the granules of polyamides and also the reinforcements having been dried under the same conditions as those previously described.

The dumbbell-shaped specimens obtained from various compositions of example 5 in accordance with the invention and comparative examples H and K are subsequently conditioned for 15 days at 23° C. at a relative humidity of 50%.

The mechanical properties of these dumbbell-shaped specimens after conditioning, in particular the tensile modulus values, are evaluated by adhering to the protocol described in standard ISO 527 1BA. The tensile modulus values (MPa) and density values are given in table 3 below.

This table 3 also reports the tensile modulus values (according to standard ISO 527 1BA, except in the case of comparative example G) and density values recorded:

for comparative example G: in example (9) of document EP 0 960 162 (it being specified that the tensile modulus measurement is given according to standard DIN 53455);

for comparative example I: on the technical sheet of the Rilsan® BZM30 O TL grade (PA11+glass fibers) sold by the company Arkema France;

for comparative example J: on the technical sheet of the Ultramid® B3EG3 commercial grade (PA6+glass fibers) from the company BASF.

TABLE 3

|  | Example | Comparative examples | | | | |
| --- | --- | --- | --- | --- | --- | --- |
|  | 5 | G | H | I | J | K |
| Polyamide (70% by weight) | MXD. 10 | PA11 | PA11 | PA11 | PA6 | PA6 |
| Reinforcements (30% by weight) | flax | long flax | flax | GF | GF | flax |
| Tensile modulus (MPa) | 6000 | 4050 | 3500 | 5300 | 6200 | 3300 |
| +/− standard deviation | +/−500 |  | +/−500 |  |  | +/−500 |
| Density | 1.20 | — | 1.13 | 1.26 | 1.37 | 1.22 |

It is observed that the tensile modulus for example 5 reaches a value comparable of conditioned dumbbell-shaped specimens formed from PA6 and from glass fibers (comparative example J), which are known to be particularly satisfactory in terms of modulus, for a much lower density.

It is of course possible to adapt the choice of biobased fibers to the mechanical properties, in particular of tensile modulus and density, desired.

For a comparable nature and amount of biobased reinforcements, the compositions according to the invention make it possible to obtain a material which is much more effective in terms of mechanical properties than a material based on PA11 or PA6. Reference may in particular be made to example 5 and comparative example H, in the case of PA11, and to example 5 and comparative example K in the case of PA6.

In the case of a composition based on PA11, this observation still remains valid, even if the biobased flax fibers are replaced with an equivalent weight amount of glass fibers (see example 5 and comparative example I).

The invention claimed is:

1. A composition comprising:
   (1) a polyamide matrix consisting of:
   (i) at least one polyamide of the formula MXDZ, or
   (ii) at least one copolyamide of the formula A/MXDZ,
   wherein MXD denotes meta-xylylenediamine or a mixture of meta-xylylenediamine and of para-xylylenediamine,
   Z is an aliphatic dicarboxylic acid moiety comprising 10 carbon atoms and the A entity is a lactam, an α,ε-aminocarboxylic acid or the product of the reaction of an aliphatic, cycloaliphatic, arylaliphatic, or aromatic, $C_4$-$C_{36}$ dicarboxylic acid with an aliphatic, cycloaliphatic, arylaliphatic or aromatic, $C_4$-$C_{36}$ diamine;
   (2) a natural reinforcement selected from the group consisting of predried flax, hemp, sisal, kenaf, abaca and jute fibers;
   (3) optionally a non-natural second reinforcement; and
   (4) optionally one additive, and optionally fillers, and
   wherein the melting point of said at least one polyamide of the formula MXDZ and said at least one copolyamide of the formula A/MXDZ is less than or equal to 215° C.,
   and
   the tensile modulus of the composition, measured according to standard ISO 527 1BA on samples conditioned for 15 days at 23° C. and at 50% relative humidity, is greater than 3500 MPa.

2. The composition as claimed in claim 1, wherein A is a lactam or an α,ω-aminocarboxylic acid comprising at least 6 carbon atoms.

3. The composition as claimed in claim 1, wherein A is caprolactam, lactam 12, 11-aminoundecanoic acid or 12-aminododecanoic acid.

4. The composition as claimed in claim 1, wherein A is the product of condensation of a diamine with a dicarboxylic acid, and said diamine is an aromatic diamine.

5. The composition as claimed in claim 1, wherein the molar proportion of the MXDZ unit, in the copolyamide of formula A/MXDZ, represents more than 25%.

6. The composition as claimed in claim 1, wherein the natural reinforcement is in the form of a ground material, a flour, a short fiber, a long fiber, woven continuous fibers, nonwoven continuous fibers, or a mat of woven or nonwoven fibers.

7. The composition as claimed in claim 1, wherein at least one additive that is impact modifiers, processing aids, UV-stabilizers, heat-stabilizers, or fire-retardants is present.

8. The composition as claimed in claim 1, wherein at least one filler is present.

9. The composition as claimed in claim 1, wherein at least one non-natural second reinforcement is present.

10. The composition as claimed in claim 9, wherein the natural reinforcement to non-natural second reinforcement mass ratio is greater than 0.3.

11. The composition as claimed in claim 9, wherein the weight proportion of natural reinforcement and non-natural second reinforcement is between 5% and 80% of the total weight of the composition.

12. The composition as claimed in claim 9, wherein the natural reinforcement and the non-natural second reinforcement have undergone a treatment aimed at improving their adhesion with respect to the polyamides, said treatment comprising:
   a chemical treatment,
   a precoating of the reinforcement with a polymeric coupling agent,
   a plasma treatment,
   a mechanical or thermomechanical treatment,
   a laser treatment, or
   a γ- or UV-irradiation.

13. The composition as claimed in claim 9, wherein the second reinforcement is a carbon fiber, carbon nanotubes or glass fibers.

14. An object obtained from a composition according to claim 1, by injection-molding, extrusion, forming, calendering, filament winding or pultrusion of said composition.

15. The object as claimed in claim 14, that is a recyclable object.

16. The object as claimed in claim 14 wherein said object is an automotive object, a construction object, an electrical or electronic object, or a sporting goods object.

17. A method for producing the composite material of claim 1, said method comprising:
   A— compounding, in an extruder or a co-kneader, between 180 and 240° C., the natural reinforcement and the polyamide matrix
   B— extruding of a rod,
   C— granulating the rod.

18. A method for producing the composite material of claim 1, said method comprising:
   A— impregnating the natural reinforcement in the polyamide matrix in a molten state between 180 and 240° C. by means of a crosshead extruder,
   B— extruding of a rod,
   C— granulating of the rod.

19. A method for producing the composite material of claim 1, said method comprising:
   A— stacking of alternating natural reinforcement and films of the polyamide matrix, or rolling of natural reinforcement multilayers alternating with a film of the polyamide matrix,
   B— hot-pressing of between 180 and 240° C.

20. A method for producing the composite material of claim 1, said method comprising:
   A— pre-impregnating of the natural reinforcement in a fluidized bed of the polyamide matrix by an electrostatic route and then heating in an oven brought to between 200° C. and 240° C., or heating in the polyamide matrix in a molten state,
   B— winding a filament,
   C— heating in an oven brought to between 180° C. and 240° C.

21. A method for producing the composite material of claim 1, said method comprising:
   A— pre-impregnating the natural reinforcement in a fluidized bed of the polyamide matrix or in a bath of the polyamide matrix in a molten state of between 180 and 240° C.,
   B— producing sheets by hot-pressing of between 180 and 240° C.

22. A method for producing the composite material of claim 1, said method comprising:
   A— drawing of the natural reinforcement and continuous impregnation of the polyamide matrix in a molten state or in a fluidized bed of powder of the polyamide matrix,
   B— passing through a heating fixture brought to between 180 and 240° C. giving the shape of the cross section of the profile.

* * * * *